(12) United States Patent
Neff et al.

(10) Patent No.: US 6,543,481 B2
(45) Date of Patent: Apr. 8, 2003

(54) PILOT OPERATED PNEUMATIC VALVE

(75) Inventors: James A. Neff, deceased, late of Bloomfield, MI (US), by Martha Welch, co-personal representative; Richard A. Fagerlie, New Smyrna Beach, FL (US)

(73) Assignee: MAC Valves, Inc., Wixom, MI (US)

( * ) Notice: Subject to any disclaimer, the term of this patent is extended or adjusted under 35 U.S.C. 154(b) by 0 days.

(21) Appl. No.: 09/951,076

(22) Filed: Sep. 12, 2001

(65) Prior Publication Data

US 2003/0047222 A1 Mar. 13, 2003

(51) Int. Cl.$^7$ .............................................. F15B 13/043
(52) U.S. Cl. ............................. 137/625.63; 137/625.64
(58) Field of Search ........................ 137/625.63, 625.64

(56) References Cited

U.S. PATENT DOCUMENTS

| | | | | |
|---|---|---|---|---|
| 2,618,244 A | * | 11/1952 | Roehm ................... | 137/625.63 |
| 2,655,939 A | | 10/1953 | Tauscher et al. ........ | 137/625.63 |
| 2,709,421 A | | 5/1955 | Avery .................... | 137/625.63 |
| 2,953,123 A | | 9/1960 | Reen et al. ............. | 137/625.63 |
| 2,970,575 A | | 2/1961 | Stern ..................... | 137/625.64 |
| 3,089,517 A | * | 5/1963 | Ludwig .................. | 137/625.63 |
| 3,126,031 A | | 3/1964 | Hayner .................. | 137/625.63 |
| 4,215,723 A | | 8/1980 | Ichiryu et al. .......... | 137/625.64 |
| 4,267,862 A | | 5/1981 | Neff et al. .............. | 137/625.64 |
| 4,453,565 A | | 6/1984 | Neff ....................... | 137/625.64 |
| 4,462,427 A | | 7/1984 | Neff ....................... | 137/625.64 |
| 4,465,100 A | | 8/1984 | Neff ....................... | 137/625.64 |
| 4,485,846 A | | 12/1984 | Neff ....................... | 137/625.64 |
| 4,574,844 A | * | 3/1986 | Neff et al. .............. | 137/625.65 |
| 4,589,437 A | * | 5/1986 | Zeuner et al. .......... | 137/625.63 |
| 5,092,365 A | * | 3/1992 | Neff ....................... | 137/625.65 |
| 5,136,774 A | | 8/1992 | Neff ....................... | 29/602.1 |
| 5,192,936 A | | 3/1993 | Neff et al. .............. | 335/281 |
| 5,666,994 A | | 9/1997 | Stoll et al. ............. | 137/625.64 |
| 6,192,937 B1 | * | 2/2001 | Fagerlie et al. ........ | 137/625.63 |

FOREIGN PATENT DOCUMENTS

JP          5-231558          9/1993

* cited by examiner

Primary Examiner—Gerald A. Michalsky
(74) Attorney, Agent, or Firm—Bliss McGlynn, P.C.

(57) ABSTRACT

A pilot operated valve assembly including a valve body having a pressurized air supply inlet port in communication with a source of pressurized air and at least one cylinder passage. A main valve bore extends axially within the valve body and a main valve member is movable between predetermined positions within the main valve bore to selectively direct pressurized air from the inlet port through at least one cylinder passage. A pilot valve bore is formed within the main valve member and extends coaxially relative to the main valve bore. A pair of short pilot cylinder ports spaced apart from one another extend between the main valve bore and the pilot valve bore. A pilot valve member is movable between predetermined positions within the pilot valve bore to selectively direct air from the pilot valve bore through alternating ones of the pilot cylinder ports to act upon the main valve member thereby moving the main valve member between predetermined positions.

18 Claims, 6 Drawing Sheets

PILOT OPERATED PNEUMATIC VALVE

BACKGROUND OF THE INVENTION

1. Field of the Invention

The invention relates, generally, to pneumatic valve assemblies and, more specifically, to a pneumatic valve having a pilot valve moveably supported in a pilot valve bore formed in the main valve member.

2. Description of the Related Art

Pilot operated pneumatic valves are well known in the art for controlling the flow of pressurized air to and from various pneumatically actuated devices such as press clutches, air brakes, air cylinders or any other pneumatic device or application requiring precise control of operating air. More specifically, two-way, three-way and four-way pilot operated valve assemblies are commonly employed in these environments. Such valves typically include a main valve body with a valve member movably supported within a valve bore in response to air pressure which is directed by a separate pilot valve to one or alternating ends of the valve member. A solenoid actuates the pilot valve to one predetermined position. A return spring or another pilot valve is employed to bias the valve member back to a known position.

Valve assemblies of this type known in the related art typically include a main valve body to which is separately mounted a pilot valve body using fasteners. Valves of this type are employed in a wide variety of manufacturing environments where a high flow rate and very fast response time are desired. As the technology for these valves has advanced, there has been an increase in the demand for smaller valves which are used in tight spaces. Over the years, there have been a number of improvements in this general field which have facilitated high flow rates and fast response times in relatively small valves. Still, there remains a need in the art for even faster and smaller valves. However, the common arrangement wherein a pilot valve is mounted to a main valve has become a design barrier which has affected the size and speed of such valves.

SUMMARY OF THE INVENTION

The present invention overcomes these design barriers and other disadvantages of the related art in a pilot operated valve assembly. More specifically, the present invention is directed toward an improved pilot operated valve assembly including a valve body having a pressurized air supply inlet port in communication with a source of pressurized air and at least one cylinder passage. A main valve bore extends axially within the valve body and a valve member is movable between predetermined positions within the main valve bore to selectively direct pressurized air from the inlet port through at least one cylinder passage. A pilot valve bore is also formed within the main valve member and extends coaxially relative to the main valve bore. A pair of short pilot cylinder ports are spaced apart from one another and extend between the main valve bore and the pilot valve bore. A pilot valve member is movably supported between predetermined positions within the pilot valve bore to selectively direct pressurized air from the pilot valve bore through alternating ones of the pilot cylinder ports to act upon the main valve member thereby moving the main valve member between its predetermined positions.

The pilot operated valve assembly of the present invention has distinct advantages over the valves known in the related art. More specifically, it is small, has a low profile and is very thin—in one embodiment only 10 mm wide. Thus, it is easily employed in environments where space is at a premium. The small size and low profile of the pneumatic valve of the present invention is facilitated by the pilot valve being integrated into the main valve body. In turn, this feature is made possible by the position of the pilot valve bore being disposed within the main valve member and coaxial to the main valve bore. The pilot valve bore and the main valve bore are connected by very short pilot cylinder ports which direct fluid flow to and from the main valve bore and immediately adjacent to either side of the main valve member to cycle the main valve member between predetermined positions. These short pilot cylinder ports minimize the volume of air required to be filled and dumped from the ends of the main valve member every time the valve is actuated. This structure results in extremely fast and consistent response times.

Further, because the pilot valve is integrated into the main valve body, various parts including fasteners, gaskets, machining and assembly operations are eliminated. The integrated pilot operated valve assembly facilitates a thin valve having a low profile because, heretofore, it was difficult to mount a pilot valve to a main valve body having only, for example, a 10 mm thickness. The pilot operated valve assembly also has impressive flow efficiency and a short stroke. In addition, the valve assembly of the present invention provides a large flow of fluid therethrough when the main valve member is in either one of its two operating positions. The short stroke feature and compactness of the valve provides an efficiently operating valve which can be actuated by a small size general purpose solenoid with low wattage or high wattage power consumption.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENT(S)

Referring now to the figures where like numerals are used to designate like structure throughout the drawings, a pilot operated valve assembly of the present invention is generally indicated at 10. As shown in FIGS. 1–4, the valve assembly 10 includes a valve body 12 and an electromagnetic actuator, such as a solenoid assembly, generally indicated at 14 and mounted to the valve body 12. The valve body 12 has a thin rectangular shape defining top and bottom surfaces 16, 18, respectively, a pair of opposed side surfaces 20, 22 extending between the top and bottom surfaces 16 and 18 and end surfaces 24, 26. The solenoid assembly 14 is mounted to the end surface 24 of the valve body 12. The valve body 12 is adapted to be mounted to a manifold, sub-base, or any of a number of various pneumatically actuated devices (not shown). From the description of the invention that follows, those having ordinary skill in the art will appreciate that the pilot operated valve assembly 10 may be a two-way valve, a three-way valve, a four-way valve or the like.

Referring now to FIGS. 1, 3, 4 and 5, the valve body 12 includes a pressurized fluid inlet port 28 for communicating with a source of pressurized fluid, such as air. Furthermore, the valve body 12 includes at least one cylinder passage 30, 32. A main valve bore 34 extends axially through the valve body 12. In the embodiment illustrated here, the pilot operated valve assembly 10 is a four-way valve and includes a pair of cylinder passages 30, 32 and a pair of exhaust passages 36, 38 each in fluid communication with the main valve bore 34. The cylinder passages 30, 32 are formed through the top surface 16 of the valve body 12 opposite the inlet port 28 and exhaust passages 36, 38 that are formed through the bottom surface 18. However, those having ordinary skill in the art will appreciate that the inlet port 28, exhaust and cylinder passages 36, 38 and 30, 32, respectively, may be formed through various, different, surfaces of the valve body 12. For example, these ports and passages may all be formed through one surface, such as the bottom 18 of the valve body 12, without departing from the scope of the invention. The inlet port 28, exhaust and cylinder passages 36, 38 and 30, 32, respectively, may also be threaded to accommodate any mechanism necessary to establish fluid communication with another element that is operatively associated with the valve assembly 10.

Figure 1:
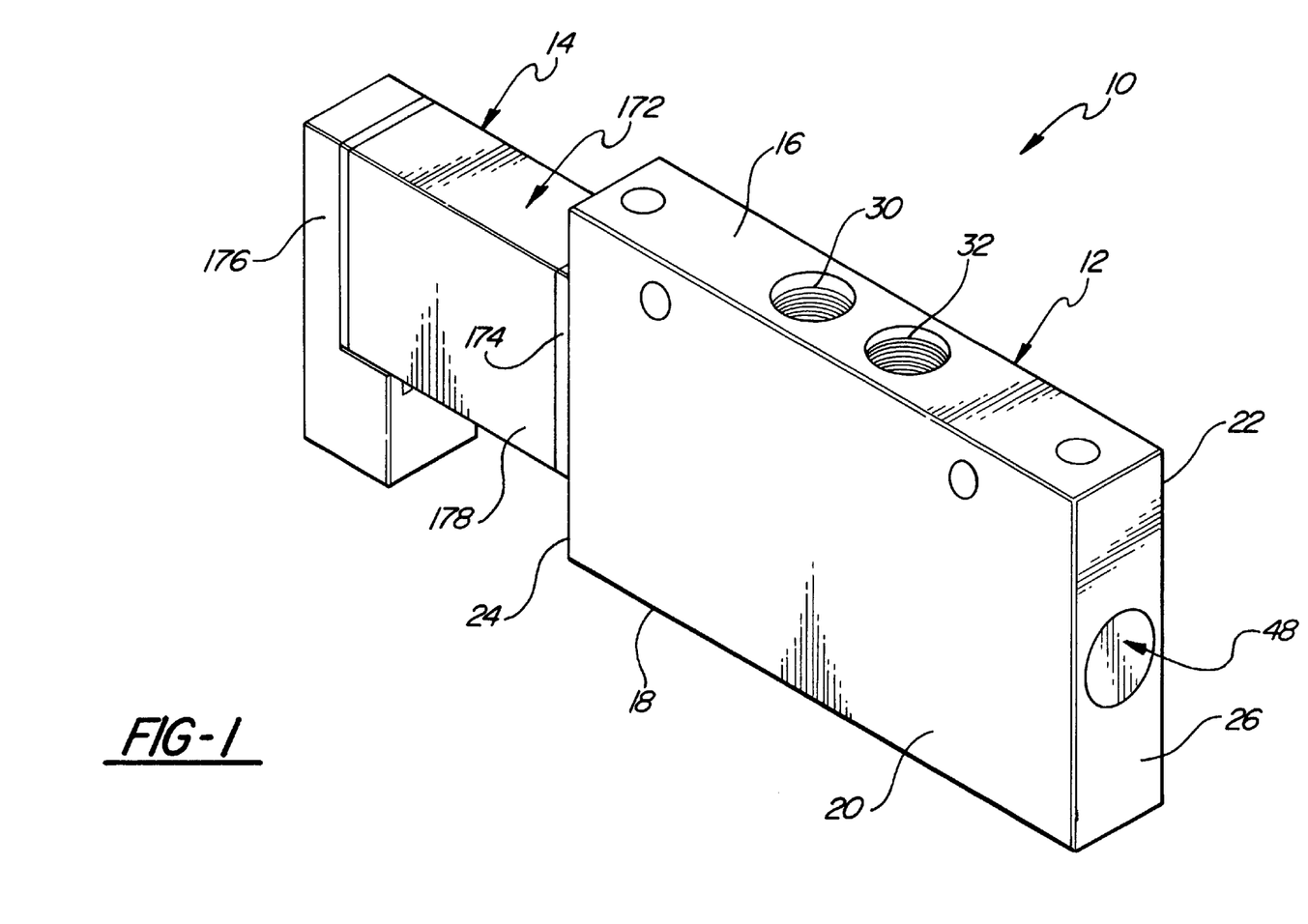
FIG. 1 is a perspective view of the valve assembly of the present invention.
Figure 2:
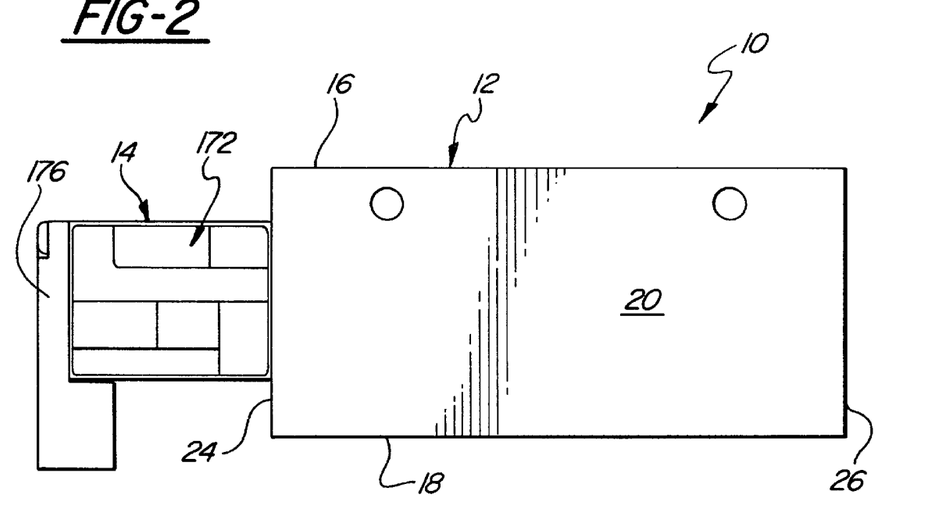
FIG. 2 is a side view of the valve assembly of the present invention.
Figure 3:
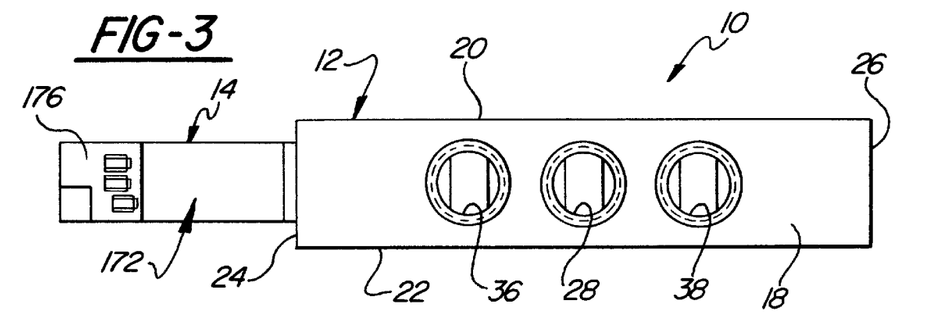
FIG. 3 is a bottom view of the valve assembly of the present invention.
Figure 4:
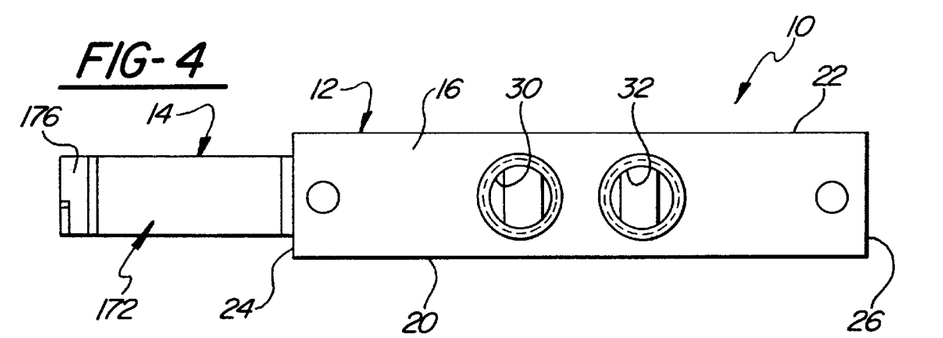
FIG. 4 is a top view of the valve assembly of the present invention.
Figure 5:
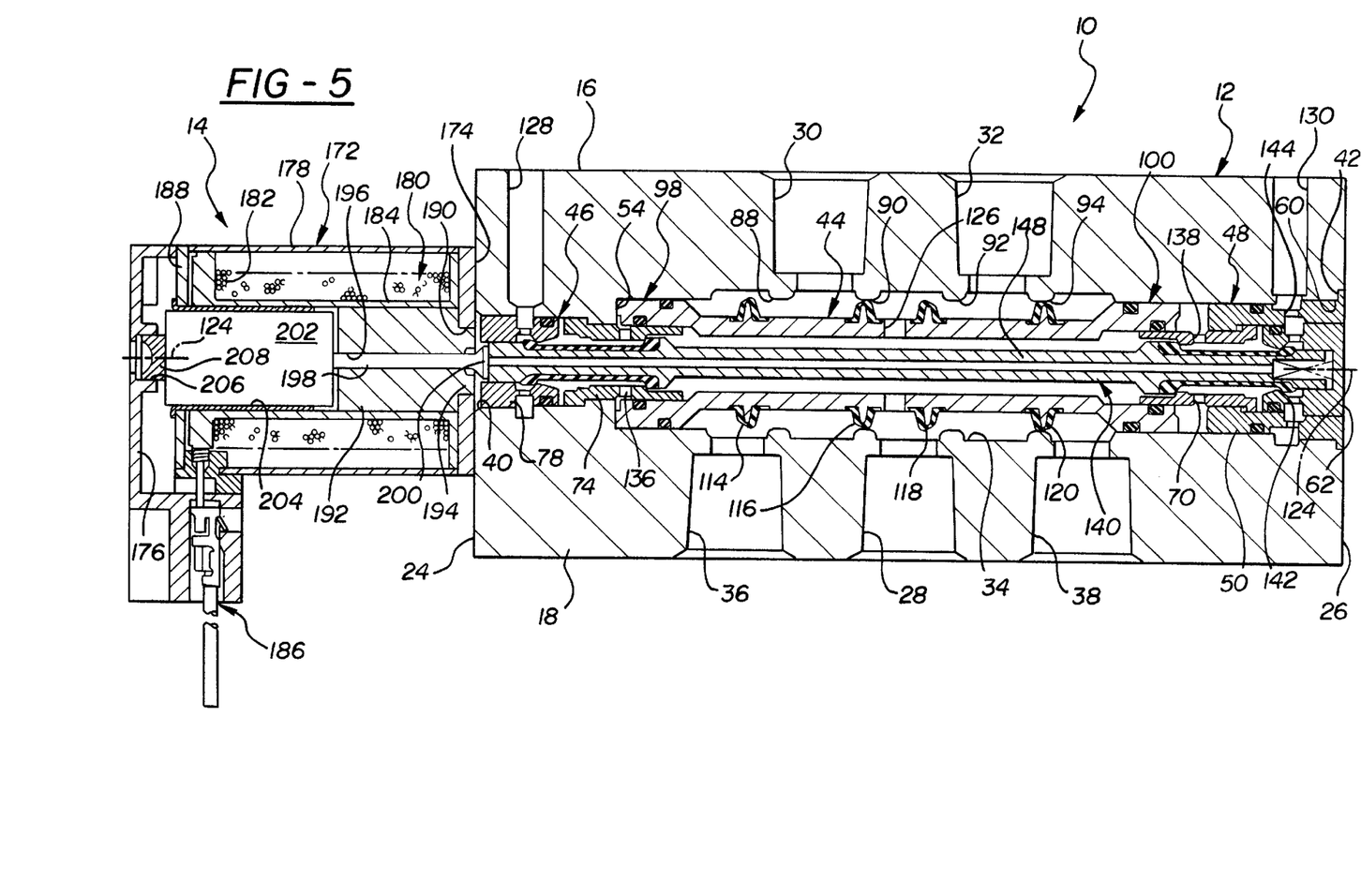
FIG. 5 is a cross-sectional side view of the valve assembly of the present invention illustrating the position of both the pilot and main valve members when the solenoid is de-energized.
Figure 8:
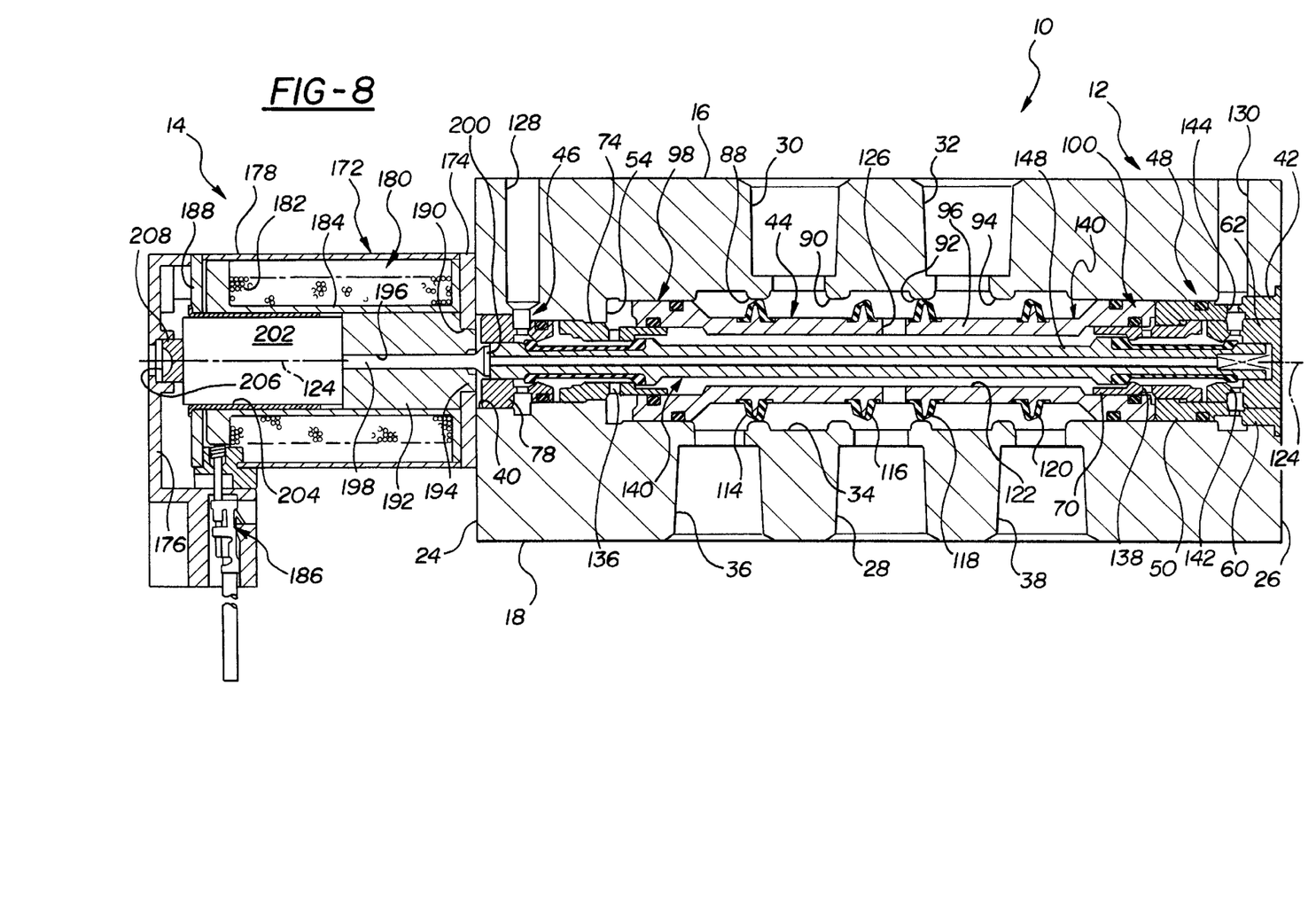
FIG. 8 is a cross-sectional side view of the valve assembly of the present invention illustrating the position of both the pilot and main valve members when the solenoid is energized.

As best shown in FIGS. 5 and 8 and as noted above, the main valve bore 34 extends completely through the valve body 12 to present a pair of open ends 40, 42. A main valve member, generally indicated at 44, is movable between predetermined positions within the main valve bore 34 to selectively direct pressurized air from the inlet port 28 through at least one of the cylinder passages 30, 32 and at least one of the exhaust passages 36, 38, as will be described in greater detail below. A pair of retainer assemblies, generally indicated at 46 and 48, are threadably received in the pair of open ends 40, 42, respectively, of the main valve bore 34 thereby functioning to close same. More specifically, the pair of retainer assemblies includes a solenoid end retainer assembly 46 threadably received within one 40 of the open ends of the main valve bore 34 adjacent the solenoid assembly 14 as well as a spring end retainer assembly 48 threadably received within the other one 42 of the open ends of the main valve bore 34. Both the solenoid end retainer assembly 46 and the spring end retainer assembly 48 will be discussed in greater detail below.

Figure 6:
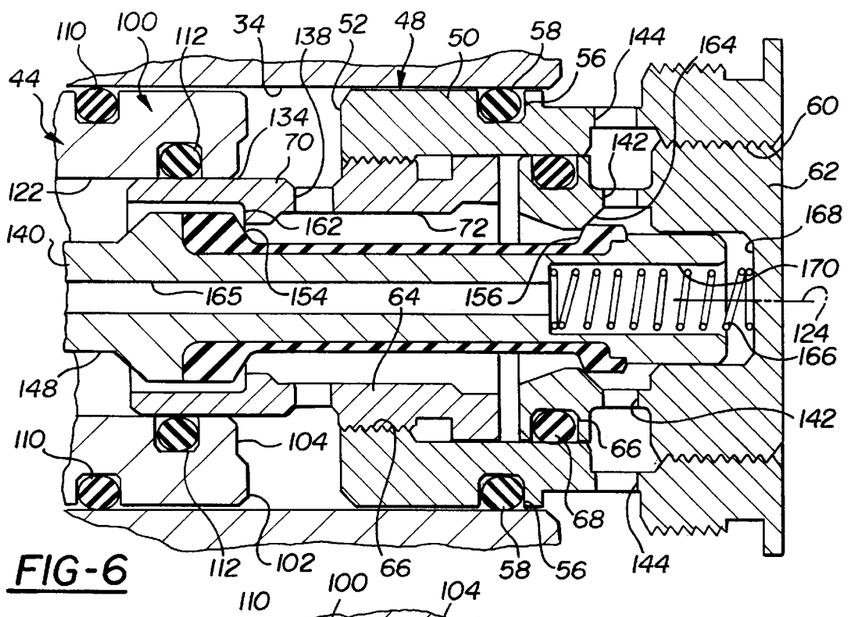
FIG. 6 is an enlarged cross-sectional side view of the spring end retainer assembly.

With reference primarily to FIG. 6, the spring end retainer assembly 48 includes a spool stop retainer 50 that presents a stop shoulder 52 at its inner terminal end. The stop shoulder 52 is adjustably positioned length-wise within the main valve bore 34 and defines at least one of the predetermined positions between which the main valve member 44 moves. On the other hand, and with reference primarily to FIG. 9, the main valve bore 34 presents an annular abutment shoulder 54 disposed opposite the stop shoulder 52 defined by the spool stop retainer 50 of the spring end retainer assembly 48. The abutment shoulder 54 defines the other one of the predetermined positions between which the main valve member 44 moves. An annular groove 56 is formed about the body of the spool stop retainer 50 and a rubber seal 58 is retained in the groove 56. The rubber seal 58 affects an air-tight seal between the spool stop retainer 50 and the main valve bore 34.

The spool stop retainer 50 also includes a first partially threaded bore 60 that extends through a portion the spool stop retainer 50. The retainer assembly 48 further includes a spring retainer 62 threadably received within the spool stop bore 60 to close same. In addition, the spring end retainer assembly 48 includes a valve seat retainer 64 that is received within a second threaded bore 66 extending through the spool stop retainer 50. The valve seat retainer 64 may include one or more annular grooves (not shown). Rubber seals (not shown) may be retained in the grooves such that an air-tight seal is affected between the spring retainer 62 and the spool stop retainer 50. The valve seat retainer 64 also defines a cup-shaped, inner terminal end 70 and a bore 72. The valve seat bore 72 forms a portion of the pilot valve bore as will be described in greater detail below.

Figure 9:
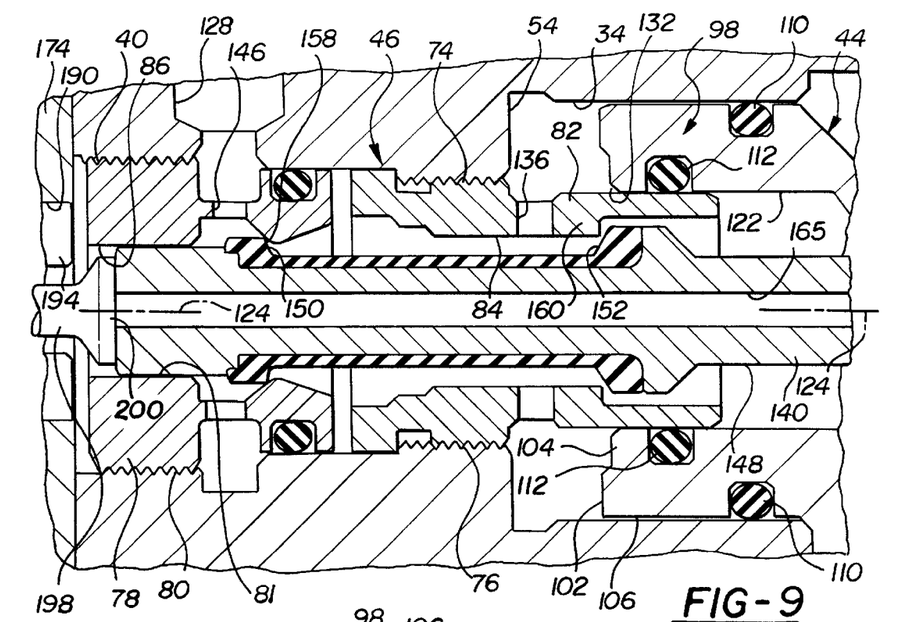
FIG. 9 is an enlarged cross-sectional side view of the solenoid end retainer assembly.

Similarly, and as best shown in FIG. 9, the solenoid end retainer assembly 46 includes an inner valve seat retainer 74 that is received within a short, partially threaded portion 76 of one end of the main valve bore 34. The solenoid end retainer assembly 46 also includes an outer valve seat retainer 78 that is received within a short, partially threaded portion 80 of one end of the main valve bore 34. The outer valve seat retainer 78 defines a bore 81 that extends for a length so as to present an opening 86. The inner valve seat retainer 74 and outer valve seat retainer 78 may include one or more annular grooves (not shown) formed thereon. Rubber seals (not shown) may be employed in the grooves such that an air-tight seal is affected between the solenoid end retainer assembly 46 and the main valve bore 34. The inner valve seat retainer 74 also defines a cup-shaped, inner terminal end 82 and a bore 84. The valve seat bore 84 forms a portion of the pilot valve bore as will be described in greater detail below.

Figure 7:
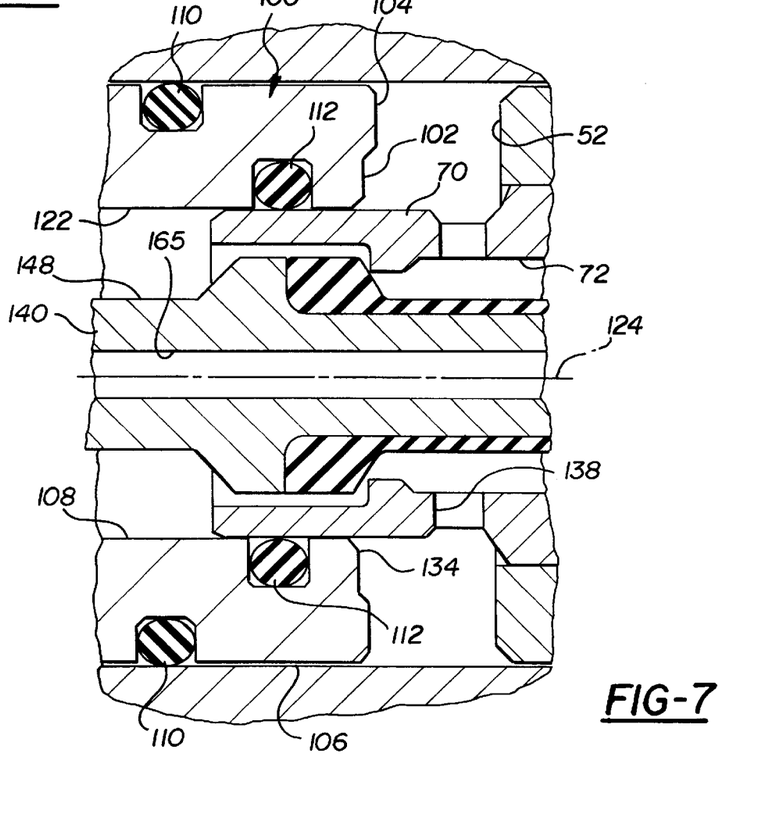
FIG. 7 is an enlarged cross-sectional side view of the spring end valve seat retainer.

Referring back to FIGS. 5 and 8, the main valve bore 34 further includes a plurality of lands 88, 90, 92, 94 forming areas of reduced diameter within the main valve bore 34. In one preferred embodiment, the main valve member 44 defines a spool valve comprised of an aluminum insert 96 having a pair of opposed annular valve heads, generally indicated at 98, 100, disposed at either end of said spool valve meets 44. Each of the opposed annular valve heads 98, 100 have stepped annular end surfaces that extend substantially transverse to the direction of rectilinear movement of the main valve member 44 within the main valve bore 34. As best shown in FIGS. 6–7 and 9–10, the stepped annular surfaces define a contact surface 102 and a piston surface 104. The contact surface 102 is adapted for abutting contact with the annular abutment shoulder 54 located at one end of the main valve bore 34 (FIGS. 9 and 10) and the stop shoulder 52 defined by the spool stop retainer 50 of the spring end retainer assembly 48 at the opposite end of the main valve bore 38 (FIGS. 6 and 7). Each of the pair of opposed valve heads 98, 100 define an outer diameter 106 moveably received in sealing engagement with the main valve bore 34 and an inner diameter 108 moveably and sealingly disposed about a corresponding one of the innermost terminal ends 70, 82 of the pair of retainer assemblies 46, 48. To this end, the outer and inner diameters 106, 108 include suitable seals 110, 112, respectively, retained in appropriate grooves for establishing air-tight contact with the main valve bore 38 and retainer assemblies 46, 48, respectively. As best shown in FIGS. 5 and 8, the aluminum insert 96 is over molded and bonded with rubber to form a plurality of valve elements 114, 116, 118, 120 defined between the opposed valve heads 98, 100. The valve elements 114, 116, 118, 120 form areas of greater diameter on the spool valve member 44 and cooperate with the lands 88, 90, 92, 94, respectively, on the main valve bore 34 to direct fluid from the main valve bore 34 through various ones of the pair of cylinder passages 30, 32 and pair of exhaust passages 36, 38.

The pilot operated valve assembly 10 of the present invention further includes a pilot valve bore 122 formed within the main valve member 44 and extending coaxial to the main valve bore 34. More specifically, the main valve bore 34 and the pilot valve bore 122 are positioned coaxial relative to one another such that the centerline of each of these bores is contained in a single axis 124. Furthermore, this axis 124 is parallel to the longitudinal axis of the valve body 12. A pilot valve inlet passage 126 extends between the pilot and the main valve bores 122, 34, respectively, and supplies the pilot valve bore 122 with pressurized air. Furthermore, the valve body 12 includes at least one, but preferably two, pilot exhaust ports 128, 130 spaced relative to one another and each located near a respective retainer assembly 46, 48. In the embodiment shown here, the pilot valve bore 122 extends longitudinally through the entire main valve member 44 so as to present a pair of open ends 132, 134 at the pair of opposed valve heads 98, 100, respectively thereof (FIGS. 6, 7, 9, and 10). The innermost terminal ends 70, 82 of the opposed valve seat retainers 64, 74 are received within the respective open ends 132, 134 of the main valve member 44.

As best shown in FIGS. 6, 7, 9, and 10, a pair of short pilot cylinder ports 136, 138 are spaced apart from one another and extend between the main valve bore 34 and the pilot valve bore 122. More specifically, the pair of short pilot cylinder ports 136, 138 may include one or more arcuate slots defined in each of the retainer assemblies 46, 48 so as to provide fluid communication between the pilot valve bore 122 and the main valve bore 34 directly adjacent the opposed spool valve heads 98, 100.

A pilot valve member 140 is movably supported between predetermined positions within the pilot valve bore 122 to selectively direct air from the pilot valve bore 122 through alternating ones of the pilot cylinder ports 136, 138 to act upon the main valve member 44 thereby moving the main valve member 44 between its predetermined positions. The pilot valve member 140 is further operable to direct pressurized air from the main valve bore 34 through alternating ones of the pilot cylinder ports 136, 138 and out at least one pilot exhaust port 128, 130 via aligned apertures 142, 144 in the spring retainer 62 and spool stop retainer 50 on one side of the valve body 12 and exhaust aperture 146 in the solenoid end retainer 46. Importantly, the pilot cylinder ports 136, 138 communicate with the main valve bore 34 immediately adjacent the opposed spool valve head 98, 100 to alternatingly direct fluid pressure against the piston surfaces 104 of the valve heads 98, 100 and exhaust fluid pressure away from the valve heads 98, 100 thereby moving the spool valve member 44 between its predetermined positions. To this end, each piston surface 104 is aligned almost flush with one side of the corresponding pilot cylinder port 136, 138, as viewed in cross-section, just before fluid has been directed against an associated valve head 98, 100.

In one preferred embodiment, the pilot valve member, 140 includes a poppet valve made of an aluminum insert having an elongated, reduced diameter portion 148 disposed between two pair of valve elements 150, 152 and 154, 156 (FIGS. 6, 7, 9, and 10). Valve elements 150, 152 are spaced relative to valve elements 154, 156 on the poppet valve member 140. The valve elements 150, 152 and 154, 156 are over molded, bonded with rubber and located at distal ends of the poppet valve member 140. Each of the two pair of valve elements includes a medial valve 152, 154 and a lateral valve 150, 156. Each of the medial valves 152, 154 control the flow of fluid between the pilot valve bore 122 and the main valve bore 34 through one of the pair of pilot cylinder ports 136, 138. In addition, each of the lateral valves 150, 156 control the flow of fluid between the main valve bore 34 and the pilot exhaust ports 128, 130 through one of the pair of pilot cylinder ports 136, 138.

Figure 10:
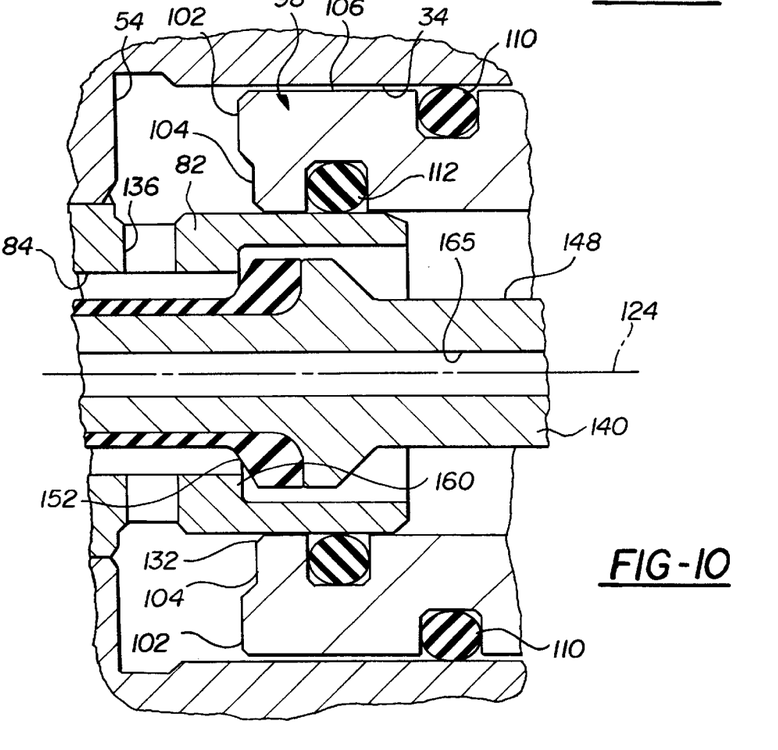
FIG. 10 is an enlarged cross-sectional side view of the solenoid end valve seat retainer.

The pilot valve bore 122 presents a plurality of valve seats 158, 160, 162, 164 that are formed in the pilot valve bore 122. More specifically, the valve seats 158, 160 are presented by the threadably adjustable inner valve seat retainer 74 of the solenoid end retainer assembly 46 located adjacent the solenoid assembly end of the pilot valve bore 122 (FIGS. 9 and 10). On the other hand, the valve seats 162, 164 are presented by the threadably adjustable valve seat retainer 64 of the spring end retainer assembly 48 located at the opposite end of the pilot valve bore 122 (FIGS. 6 and 7). The retainer assemblies 46, 48 are adjustably positioned within the valve body 12 such that the valve seats 158, 160, 162, 164 may be selectively positioned within said pilot valve bore 122 to define the predetermined positions between which said pilot valve member 140 moves within the said pilot valve bore 122. The valve seats 158, 160, 162, 164 cooperate with the valve elements 150, 152, 154, 156, respectively, to seal various passages in the valve as will be discussed in greater detail below. At least one short pilot cylinder port 136, 138 is defined in each of said pilot valve seat retainers 64, 74, respectively. The elongated reduced diameter portion 148 of the pilot valve member 140 between the two pair of valve elements 150, 152 and 154, 156 creates a pressure accumulator in the pilot valve bore 122 of sufficient volume such that it reduces the pressure drop therein when the pilot valve and main valve shifts. The pilot valve member 140 also includes a central, axially extending inner passage 165 that extends completely through the pilot valve member 140. The central, inner passage 165 provides a means for automatically balancing the pneumatic forces acting on either end of the pilot valve member 140.

As best shown in FIG. 6, the pilot operated valve assembly 10 also includes a biasing member 166 which moves the pilot valve member 140 in one direction and an electromagnetic actuator 14 for moving the pilot valve member 140 in an opposite direction. Here, the biasing member includes a coiled spring 166 disposed between a cup shaped cavity 168 formed in the spring retainer 62 and a recess 170 defined in one end of the pilot valve member 140. The coiled spring 166 biases the pilot valve member 140 to the left as shown in FIGS. 5 and 6. On the other hand, and as alluded to above, the electromagnetic actuator is a solenoid assembly 14 mounted to the valve body 12 so as to actuate the pilot valve member 140 within the pilot valve bore 122 in a direction opposite to the biasing force of the coiled spring 166 as shown in FIGS. 8 and 9.

The solenoid assembly 14 includes a thin, rectangular shaped housing, generally indicated at 172. The housing 172 includes a pole plate 174 abutting the valve body 12, a cap 176 disposed opposite the pole plate 174 and a solenoid can or frame 178 extending therebetween. The frame 178 supports a coil 180 including a conductive wire 182 conventionally wrapped around a bobbin 184. The conductive wire 182 is connected to a source of electrical current through leads, generally indicated at 186. The direction of the current through the coil 180 and thus the direction of the electromagnetic force generated thereby is controlled by a control circuit (not shown). A top plate 188 is mounted adjacent the bobbin 184 and between the frame 178 and the cap 176.

The pole plate 174 includes an opening 190 extending therethrough. The solenoid assembly 14 further includes a ferromagnetic pole piece 192 having a stepped portion 194 with a smaller cross-sectional area than the rest of the pole piece 192. The stepped portion 194 is received in the opening 190 in the pole plate 174 for mechanically fixing the pole piece 192 to the pole plate 174. A centrally located passage 196 extends through the pole piece 192. A pushpin 198 having an enlarged head 200 at one end thereof is movably supported in the passage 196 and may be extended through the opening 86 in the solenoid end retainer 46 into valve seat bore 84 (FIG. 9). The pushpin 198 acts on the pilot valve member 140 to move it against the biasing force of the coiled spring 166 as will be described in greater detail below.

With continuing reference to FIGS. 5 and 8, an armature 202 is disposed between the cap 176 and the pole piece 192. A bushing 204 isolates the armature 202 from the bobbin 184. The armature 202 is movable toward the pole piece 192 under the influence of an electromagnetic flux generated by a pulse of current flowing through the coil 180. The armature 202 drives the pushpin 198 to move the pilot valve member 140 to one predetermined position and against the biasing force of the coiled spring 166. Furthermore, the armature 202 is movable away from the pole piece 192 and toward the cap 176 under the biasing influence of the coil spring 166 acting on the pilot valve member 140 through the pushpin .198 when the current through the coil 180 is interrupted. In this way, the pilot valve member 140 is cycled between its positions to control the flow of pressurized air through the valve body 12 as will be described in greater detail below. The cap 176 of the solenoid housing 172 includes an aperture 206. A manual operator 208 is movably mounted in the aperture 206. The manual operator 208 is, in essence, a plastic button that may be employed to activate the armature and therefore the pilot valve member 140 in the absence of electrical power.

OPERATION

In operation, fluid, such as air, enters the valve body 12 via the main valve inlet port 28, flows into the main valve bore 34, past the main spool valve member 44, through the pilot inlet passage 126 and into the pilot valve bore 122. The flow of air through the pilot valve is controlled by the movement of the solenoid actuated pilot valve member 140. When the solenoid member 14 is actuated, the pilot valve member 140 is moved to the right as viewed in FIGS. 8, 9 and 10. The medial valve element 152 is spaced from the valve seat 160 and is therefore now open. Air from the pilot valve bore 122 flows directly into the short cylinder port 136 and acts on the piston surface 104 of the left valve head 98 to move the main valve member 44 to the right as viewed in these figures. Pilot exhaust port 128 is sealed by lateral valve element 150 cooperating with valve seat 158. At the same time, air from the main valve bore 34 adjacent the right valve head 100 is immediately exhausted through the pilot cylinder port 138 past the open lateral valve element 156 which is now spaced from valve seat 164 and out pilot exhaust port 130 (FIG. 6).

When the main valve member 44 is moved to the right as dictated by the position of the pilot valve member 140 as viewed in FIGS. 8, 9 and 10 air from the main valve inlet 28 is directed from the main valve bore 34 past valve element 116 and land 90 and into cylinder passage 30. At the same time, valve element 118 cooperates with land 92 to seal the main valve bore 34 left of the land 92 as viewed in FIG. 8 and air from the cylinder passage 32 is exhausted past valve element 120 and land 94 through exhaust passage 38.

When the solenoid assembly 14 is de-energized, the return spring 166 moves the pilot valve member 140 back to the left, as viewed in FIGS. 5, 6, and 7. Air entering the pilot valve is then directed past medial valve element 154 which is spaced from valve seat 162 into the short pilot cylinder port 138 and is directed against the piston surface 104 of the right main valve head 100 to move the main spool valve member 44 to the left as viewed in these figures. The pilot exhaust port 130 is sealed by the lateral valve element 156 cooperating with the valve seat 164. At the same time, pilot exhaust port 128 is opened to exhaust air from the main valve bore 34 adjacent to the left valve head 98 through the short pilot cylinder port 136 past the lateral valve element 150 and the valve seat 158 and out pilot exhaust port 128 (FIG. 9).

When the main spool valve member 44 moves to the left, the exhaust passage 38 is sealed as the valve element 120 cooperates with the land 94. Air from the main valve inlet 28 flows from the main valve bore 34, past valve element 118 and land 92 into the main cylinder passage 32. At the same time, air from the main cylinder passage 30 flows into the main valve bore 34 past valve element 114 and land 88 and is exhausted via the exhaust passage 36.

The structure of the pilot operated valve assembly 10 of the present invention as described above has distinct advantages over the valves known in the related art. More specifically, the pilot operated valve assembly 10 of the present invention is very small and thin—in one embodiment only 10 mm wide. Thus, it is easily employed in environments where space is at a premium. The small size of the pneumatic valve of the present invention is facilitated by the pilot valve being integrated into the main valve body 12. In turn, this feature is made possible by the position of the pilot valve bore 122 being disposed within the main valve member 44 and coaxial to the main valve bore 34. The pilot valve bore 122 and the main valve bore 34 are connected by very short pilot cylinder ports 136, 138 to direct fluid flow to and from the main valve bore 34 and immediately adjacent to the opposed valve heads 98, 100 on the main valve member 44 to cycle the main valve member 44 between predetermined positions. This structure results in extremely fast response time and high flow rates through the valve 10.

Further, because the pilot valve is integrated into the main valve body 12, various parts including fasteners, gaskets and machining and assembly operations are eliminated. The integrated pilot operated valve assembly 10 further facilitates the thinness of the valve because, heretofore, it was difficult to mount a pilot valve to a main valve body having only, for example, a 10 mm thickness. The pilot operated valve assembly 10 of the present invention also has impressive flow efficiency and a short stroke. In addition, the valve assembly 10 of the present invention provides a large flow of fluid therethrough when the main valve member is in either one of its two operating positions. The short stroke feature and compactness of the valve provides an efficiently operating valve which can be actuated by small size, general purpose solenoid assembly 14 with low wattage or high wattage power consumption.

The invention has been described in an illustrative manner. It is to be understood that the terminology that has been used is intended to be in the nature of words of description rather than of limitation. Many modifications and variations of the invention are possible in light of the above teachings. Therefore, within the scope of the appended claims, the invention may be practiced other than as specifically described.

We claim:

1. A pilot operated valve assembly comprising:
   a valve body having a pressurized air supply inlet port in communication with a source of pressurized air, and at least one cylinder passage;
   a main valve bore extending axially through said valve body to present a pair of open ends, a pair of retainer assemblies threadably received in said pair of open ends of said main valve body to close same wherein each of said pair of retainer assemblies define an innermost terminal end, and a main valve member defining a spool valve having a pair of opposed annular valve heads disposed at either end of said spool valve, said main valve member movable between predetermined positions within said main valve bore to selectively direct pressurized air from said inlet port through said at least one cylinder passage;
   a pilot valve bore formed within and extending through said main valve member coaxially relative to said main valve bore to present a pair of open ends at said pair of opposed valve heads, each of said pair of opposed valve heads defining an outer diameter moveably received in sealing engagement with said main valve bore and an inner diameter moveably and sealingly disposed about a corresponding one of said innermost terminal ends of said pair of retainer assemblies;
   a pair of short pilot cylinder ports defined in said pair of retainer assemblies and spaced apart from one another, said pair of short pilot cylinder ports extending between said main valve bore and said pilot valve bore so as to provide fluid communication between said main valve bore and said pilot valve bore; and
   a pilot valve member movable between predetermined positions within said pilot valve bore to selectively direct air from said pilot valve bore through alternating ones of said pilot cylinder ports to act upon said main valve member thereby moving said main valve member between said predetermined positions.

2. A pilot operated valve assembly as set forth in claim 1 wherein said main valve bore and said pilot valve bore are positioned relative to one another such that the centerline of each of said bores is coincident with respect to each other and parallel to the longitudinal axis of said valve body.

3. A pilot operated valve assembly as set forth in claim 1 wherein each of said retainer assemblies presents a plurality of pilot valve seats adjustably positioned within said pilot valve bore to define the predetermined positions between which said pilot valve member moves within said pilot valve bore.

4. A pilot operated valve assembly as set forth in claim 3 wherein each of said pair of retainer assemblies includes a pilot valve seat retainer adjustably disposed within said main valve body and with at least one of said short pilot cylinder port defined in each of said pilot valve seat retainers.

5. A pilot operated valve assembly as set forth in claim 4 wherein each of said pilot valve seat retainers presents at least one of said plurality of pilot valve seats.

6. A pilot operated valve assembly as set forth in claim 4 wherein said retainer assemblies include a spool stop retainer threadably received within one of said open ends of said main valve bore, said spool stop retainer presenting a stop shoulder positioned within said main valve bore and defining at least one of said predetermined positions between which said main valve member moves.

7. A pilot operated valve assembly as set forth in claim 6 wherein said main valve bore presents an abutment shoulder disposed opposite said stop shoulder defined by said spool stop retainer, said abutment shoulder defining the other one of said predetermined positions between which said main valve member moves.

8. A pilot operated valve assembly as set forth in claim 6 wherein said spool stop retainer includes a first threaded bore that defines a portion of said pilot valve bore, said retainer assembly including a spring retainer threadably received within said first threaded spool stop bore and a biasing member captured between said spring retainer and said pilot valve member.

9. A pilot operated valve assembly as set forth in claim 8 wherein said retainer assembly includes a solenoid end retainer threadably received within one of said open ends of said main valve bore and defining an annular passageway which forms a portion of said pilot valve bore, said solenoid end retainer disposed opposite said spring retainer and presenting at least one of said plurality of pilot valve seats.

10. A pilot operated valve assembly as set forth in claim 8 wherein said spool stop retainer defines a second threaded bore, at least one of said pilot valve seat retainers being threadably received within said second spool stop bore.

11. A pilot operated valve assembly as set forth in claim 8 wherein said retainer assembly includes inner and outer solenoid end retainers, said inner and outer solenoid end retainers threadably received within one of said open ends of said main valve bore and defining an annular passage way that forms a portion of said pilot valve bore, said inner and outer solenoid end retainers being disposed opposite said spring retainer and presenting a pair of said plurality of pilot valve seats.

12. A pilot operated valve assembly as set forth in claim 1 wherein said valve body includes at least one pilot exhaust port, said pilot valve member further operable to direct pressurized air from said main valve bore through alternating ones of said pilot cylinder ports and out said at least one pilot exhaust port.

13. A pilot operated valve assembly as set fort in claim 1 wherein said valve body includes a pair of pilot exhaust ports, said pilot valve member including a poppet valve having an elongated, reduced diameter portion disposed between two pair of valve elements located distal to either end of said poppet valve;
   each of said two pair of valve elements including a medial valve and a lateral valve;
   each of said medial valves controlling the flow of fluid between said pilot valve bore and said main valve bore through one of said pair of pilot cylinder ports; and
   each of said lateral valves controlling the flow of fluid between said main valve bore and said pilot exhaust ports through one of said pair of pilot cylinder ports.

14. A pilot operated valve assembly as set forth in claim 1 further including a biasing member for moving said pilot valve member in one direction and an electromechanical actuator for moving said pilot valve member in the opposite direction.

15. A pilot operated valve assembly as set forth in claim 14 wherein said electromechanical actuator includes a solenoid assembly.

16. A pilot operated valve assembly as set forth in claim 15 wherein said solenoid assembly is mounted to said valve body so as to actuate said pilot valve member within said pilot valve bore in a direction opposite to a biasing force generated by said biasing member.

17. A pilot operated valve assembly as set forth in claim 1 wherein said valve body includes a pair of cylinder passages and a pair of exhaust passages each in fluid communication with said main valve bore, said main valve bore including a plurality of lands, said main valve member includes a plurality of valve elements defined between said pair of opposed valve heads, said valve elements cooperating with said lands to direct fluid from said main valve bore through various ones of said pair of cylinder passages and said pair of exhaust passages.

18. A pilot operated valve assembly as set forth in claim 17 wherein said pilot cylinder ports communicate with said main valve bore immediately adjacent said opposed spool valve heads to alternatingly direct fluid pressure against said valve heads thereby moving said spool valve between said predetermined positions.

* * * * *